US005841877A

United States Patent [19]

Mihara

[11] Patent Number: 5,841,877

[45] Date of Patent: Nov. 24, 1998

[54] VEHICLE ARMREST TRANSDUCING

[75] Inventor: Eiji Mihara, Yokohama, Japan

[73] Assignee: Bose Corporation, Framingham, Mass.

[21] Appl. No.: 779,948

[22] Filed: Oct. 21, 1991

[51] Int. Cl.[6] ........ H04B 1/00

[52] U.S. Cl. ........ 381/86; 381/88; 381/24; 381/90

[58] Field of Search ........ 381/86, 169, 188, 381/205, 87, 24, 88, 90

[56] References Cited

U.S. PATENT DOCUMENTS 4,580,653 4/1986 Owens ........ 381/86
4,897,877 1/1990 Tetzlaff ........ 381/86
4,932,060 6/1990 Schreiber ........ 381/24
4,944,019 7/1990 Watanabe ........ 381/205

FOREIGN PATENT DOCUMENTS 0096790 7/1980 Japan ........ 381/86

*Primary Examiner*—Nina Tong
*Attorney, Agent, or Firm*—Fish & Richardson P.C.

[57] ABSTRACT

A vehicle electroacoustical transducing system comprises a vehicle armrest having a bass enclosure. The enclosure is generally rectangular having a length, width and height corresponding substantially to the length, width and height, respectively, of the vehicle armrest.

12 Claims, 6 Drawing Sheets

VEHICLE ARMREST TRANSDUCING

The present invention relates in general to electroacoustical transducing and more particularly concerns novel apparatus and techniques for providing good sound reproduction in a vehicle using a woofer structure conveniently accommodated in a vehicle armrest providing good bass reproduction from a nonlocalizable source.

The invention embodies principles of Bose U.S. Pat. No. 4,549,631 granted Oct. 29, 1985 for MULTIPLE PORTING, Schreiber U.S. Pat. No. 4,932,060 granted Jun. 5, 1990, for STEREO ELECTROACOUSTICAL TRANSDUCING and the commercially available BOSE AM-5 and AM-3 loudspeaker systems incorporated by reference herein.

It is an important object of the invention to provide good sound reproduction in a vehicle in a compact structure including a bass enclosure in a vehicle armrest.

According to the invention, there is a generally rectangular enclosure having an internal baffle extending along the length of the enclosure and formed with an opening for accommodating a loudspeaker driver near a first end panel of the enclosure. Preferably the intermediate baffle is asymmetrically located in the enclosure to define a first larger subchamber for accommodating the loudspeaker driver and a second smaller subchamber. The second subchamber is adjacent to a number of panels that comprise first and second ports having side-by-side first and second outlets, respectively, near a second end panel of the enclosure opposite the first end panel. Preferably, the first port has an inlet for receiving energy from the second subchamber and the second port is L-shaped extending along the end of the enclosure adjacent to the second end panel and having an inlet opening into the first subchamber. This enclosure comprises a vehicle armrest and has length, width and height corresponding substantially to the length, width and height of a vehicle armrest midway between side-by-side seats of a vehicle. Preferably, there are first and second upper frequency radiating cube loudspeaker drivers that may be located in the front of the vehicle for radiating upper frequency spectral components.

Numerous other features, objects and advantages of the invention will become apparent from the following detailed description when read in connection with the accompanying drawing in which:

FIG. 1*a* is a pictorial representation of a vehicle electroacoustical transducing system according to the invention including a bass enclosure in the armrest;

FIG. 1*b* is a fragmentary view of the seatbelt assembly;

Figure 1A:
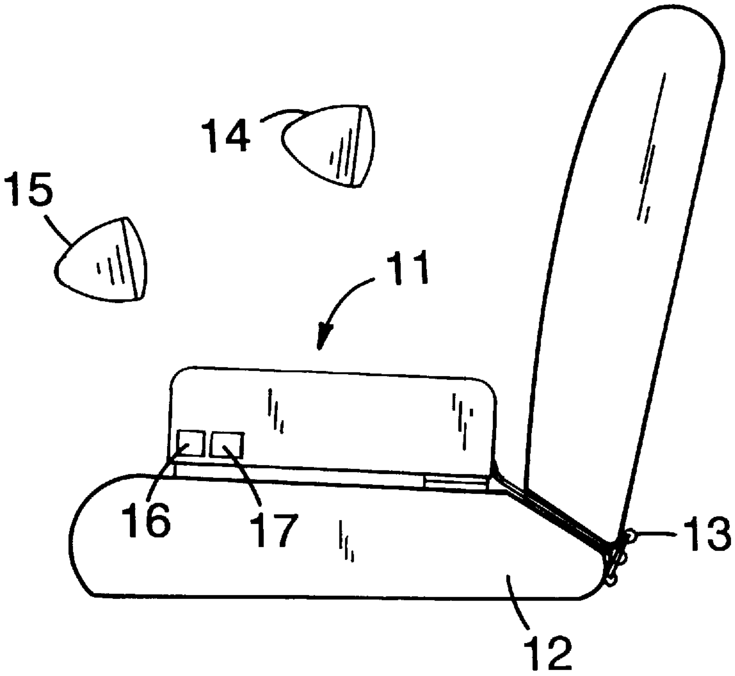
Figure 1B:
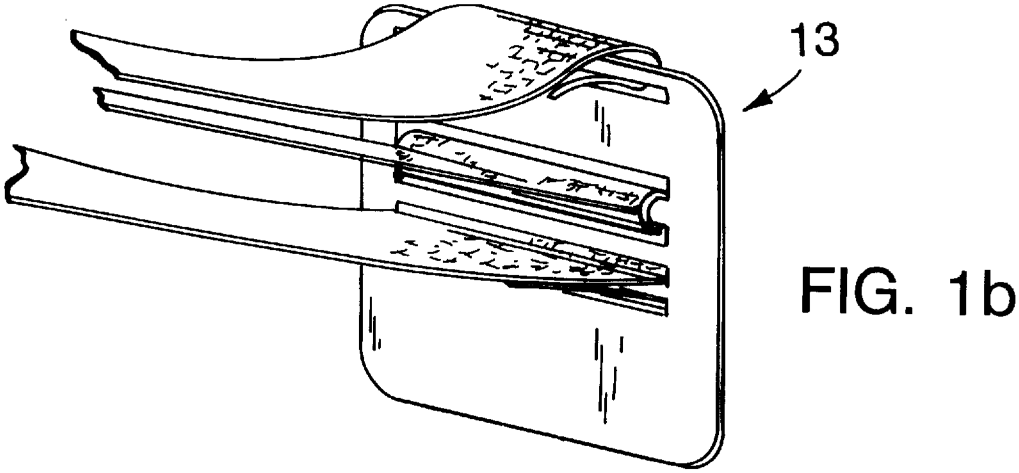

With reference to the drawings and more particularly FIG. 1*a* thereof, there is shown a pictorial representation of a vehicle electroacoustical transducing system according to the invention. The invention includes a bass enclosure in armrest 11 on vehicle seat 12 preferably secured by seatbelt assembly 13, shown in an enlarged fragmentary view in FIG. 1*b*. The system also includes a right upper frequency radiator 14 and left upper frequency radiator 15. The bass enclosure includes port outlets 16 and 17.

Preferably the bass enclosure radiates sound energy having spectral components below a predetermined cutoff frequency sufficiently low so that listeners in the vehicle do not localize on sound energy exiting from the bass enclosure. Upper frequency radiators 14 and 15 radiate sound energy with spectral components above this cutoff frequency and preferably provide stereo reproduction with upper frequency radiators 14 and 15 radiating right and left channel information of a stereo signal, respectively.

Figure 2:
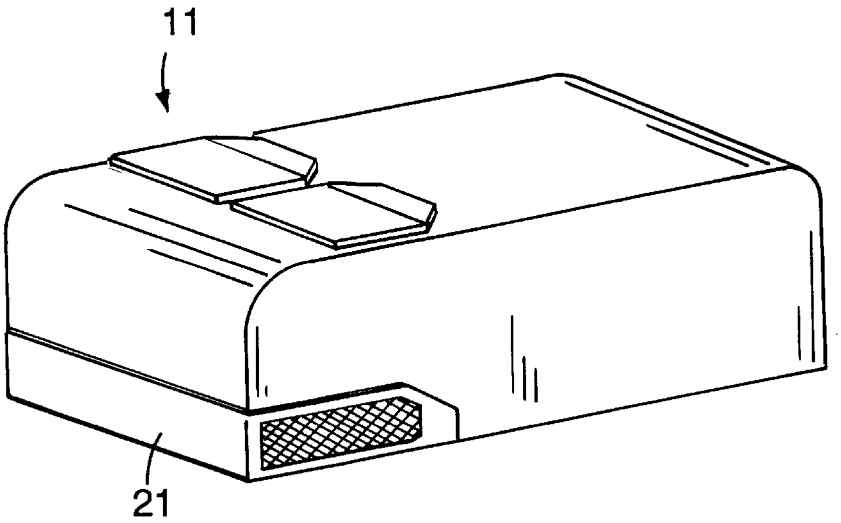
FIG. 2 is a perspective view of the armrest bass enclosure.
Figure 3:
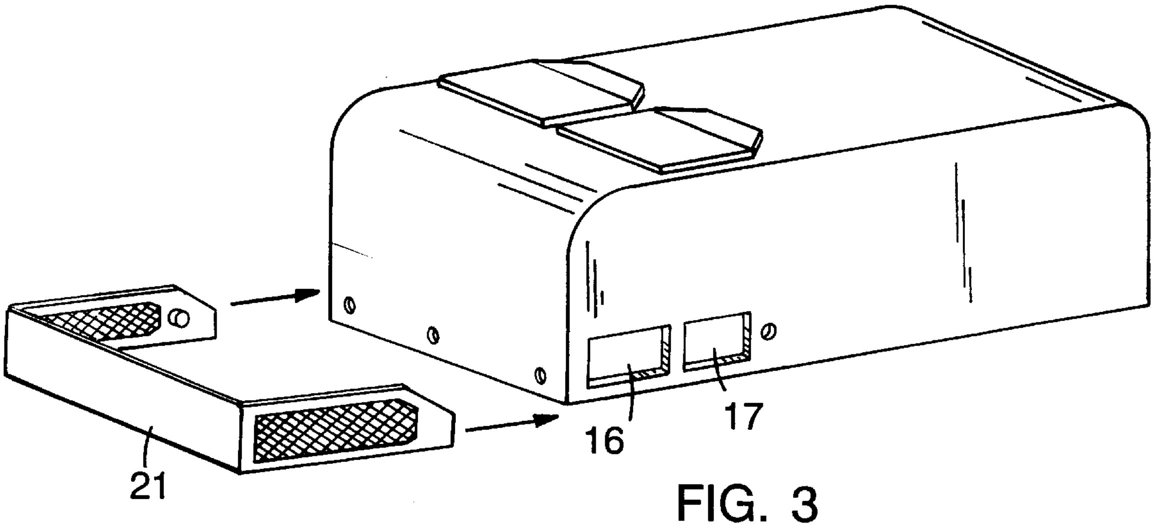
FIG. 3 is an exploded view of the armrest bass enclosure of FIG. 2 with the port grille detached exposing the side-by-side port openings.

Referring to FIG. 2, there is shown a perspective view of an exemplary embodiment of the bass enclosure having a port grille 21 for covering port outlets 16 and 17. FIG. 3 shows how port grille 21 slides over the lower portion of the bass enclosure to create the appearance shown in FIG. 2.

Figure 4:
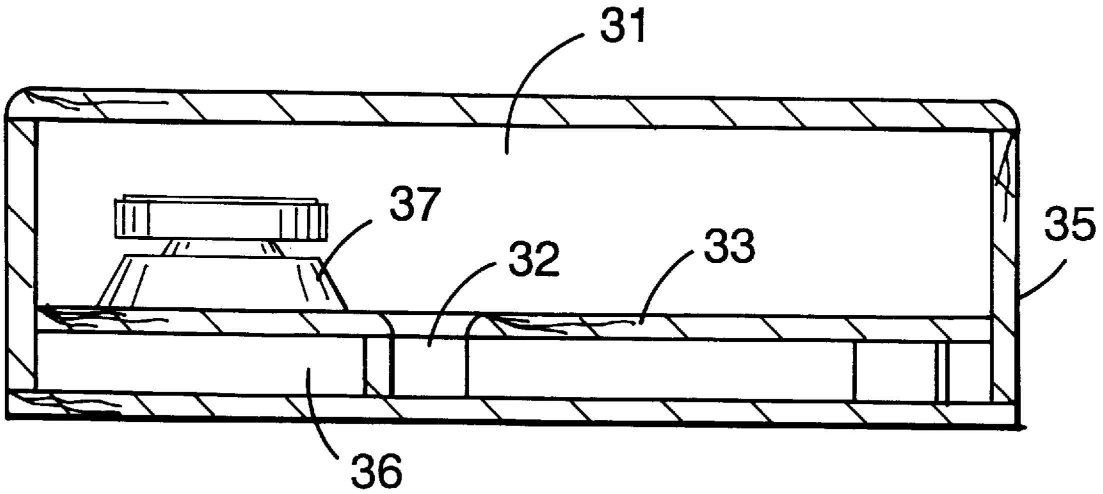
FIG. 4 is an elevation view of the bass enclosure with a side panel removed.
Figure 5:
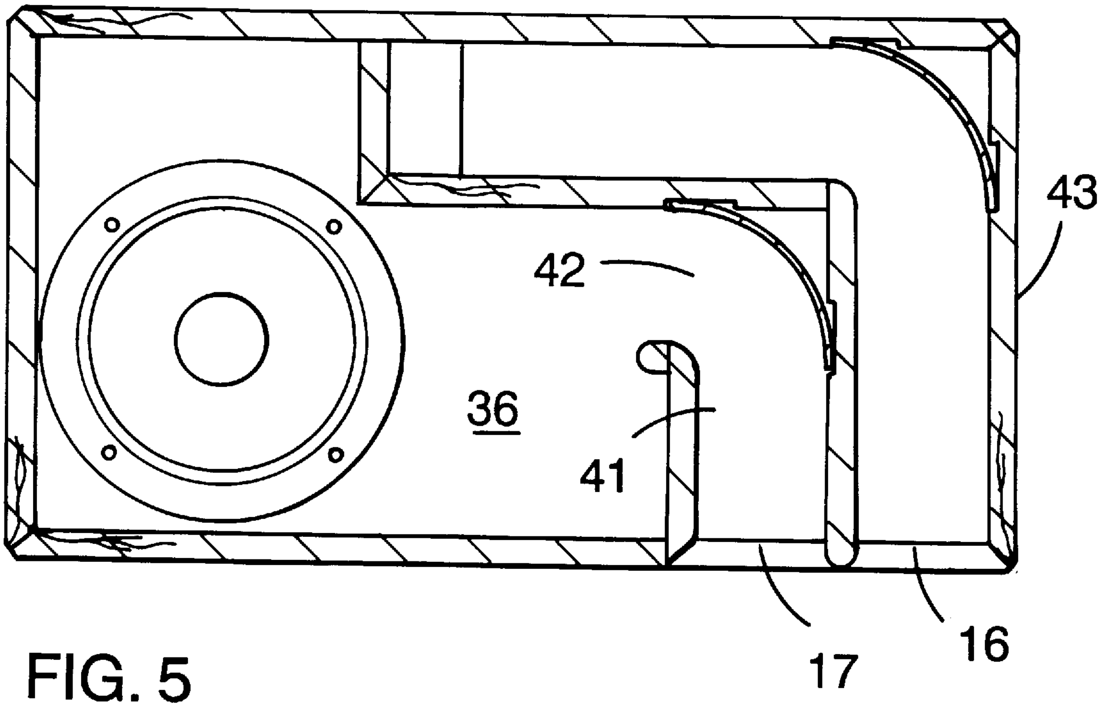
FIG. 5 is a plan view of the bass enclosure with the bottom panel removed.

Referring to FIGS. 4 and 5, there are shown elevation and plan views, respectively, of the bass enclosure with certain panels removed helpful in understanding the structural arrangement of the enclosure with dimensions in millimeters indicated in a specific embodiment of the invention. The enclosure includes a first larger upper subchamber 31 having a port inlet 32 and bounded by intermediate baffle 33 that extends from a first end 34 to a second end 35. There is a lower smaller subchamber 36. Bass loudspeaker driver 37 is seated over an opening in intermediate baffle 33 facing lower subchamber 36. Panels in lower subchamber 36 define a first smaller port 41 extending between port outlet 17 and port inlet 42 from subchamber 36. Panels also define a generally L-shaped larger port 43 extending between port outlet 16 and port inlet 32 from subchamber 31.

Figure 6:
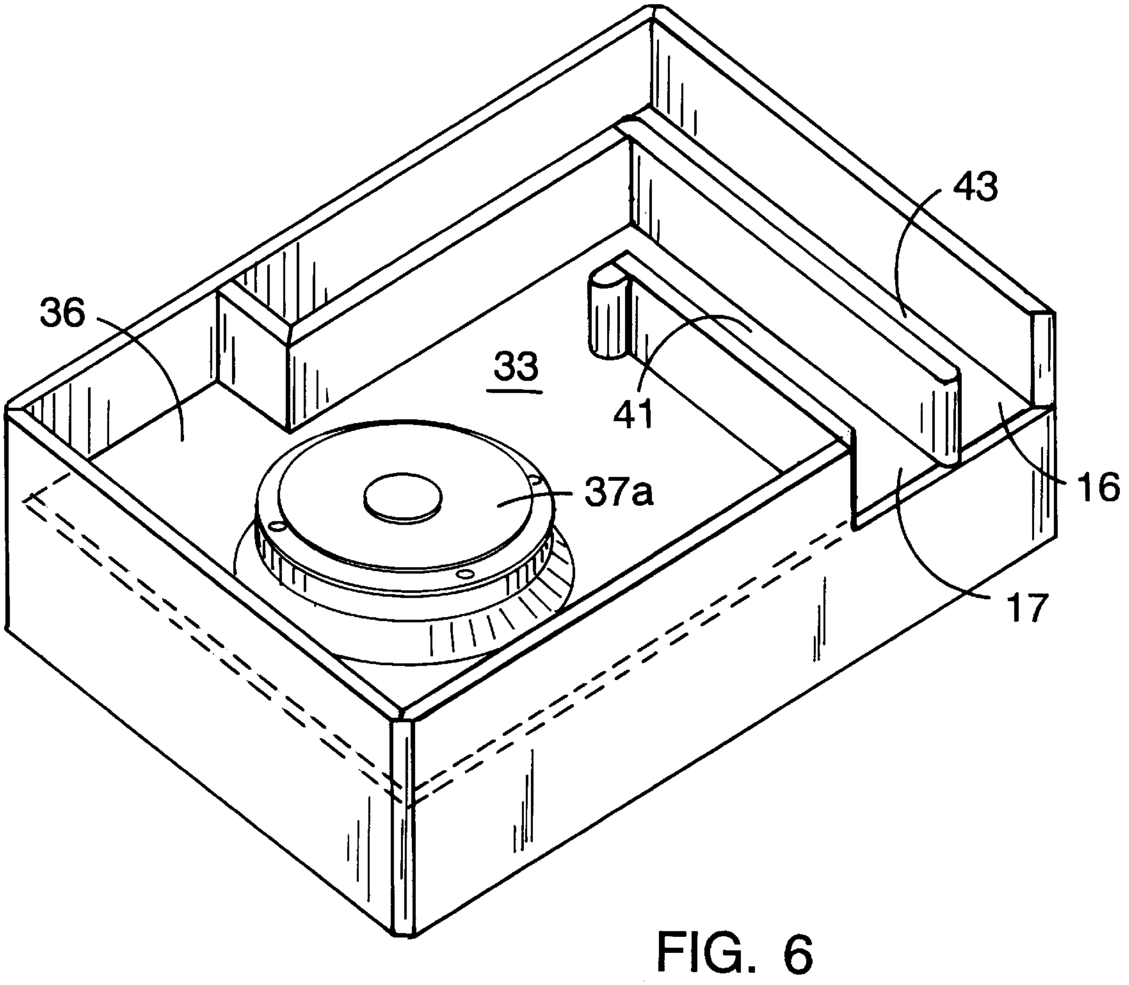
FIG. 6 is a diagrammatic perspective view of the bass enclosure with the bottom panel removed.

Referring to FIG. 6, there is shown a perspective view of the bass enclosure with loudspeaker driver 37 removed and the panel covering subchamber 36 removed to illustrate the structural features and expose opening 37A covered by loudspeaker driver 37.

Figure 7A:
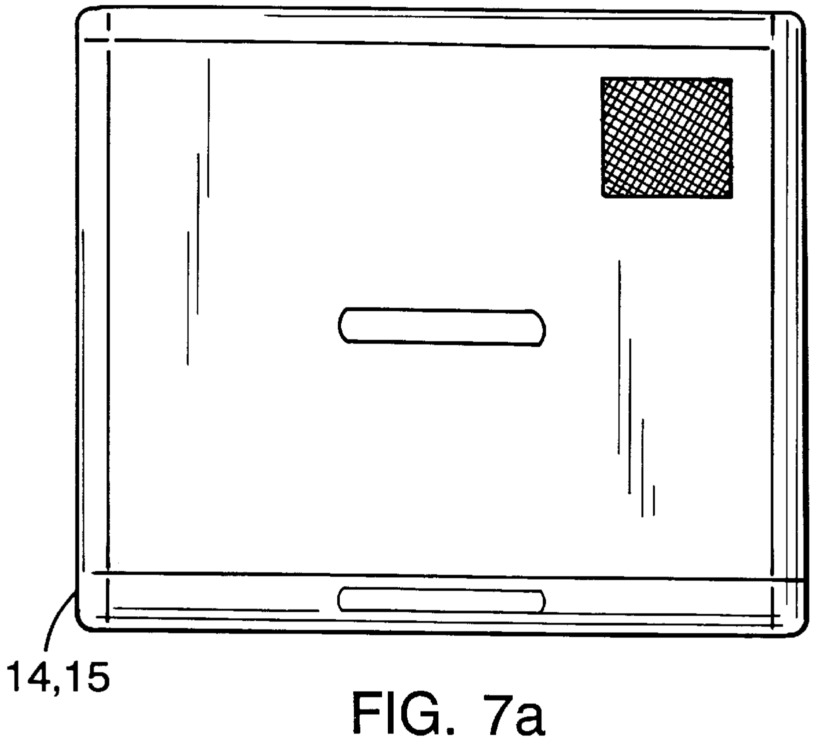
FIGS. 7A and 7B are front and top views of suitable upper frequency drivers.
Figure 7B:
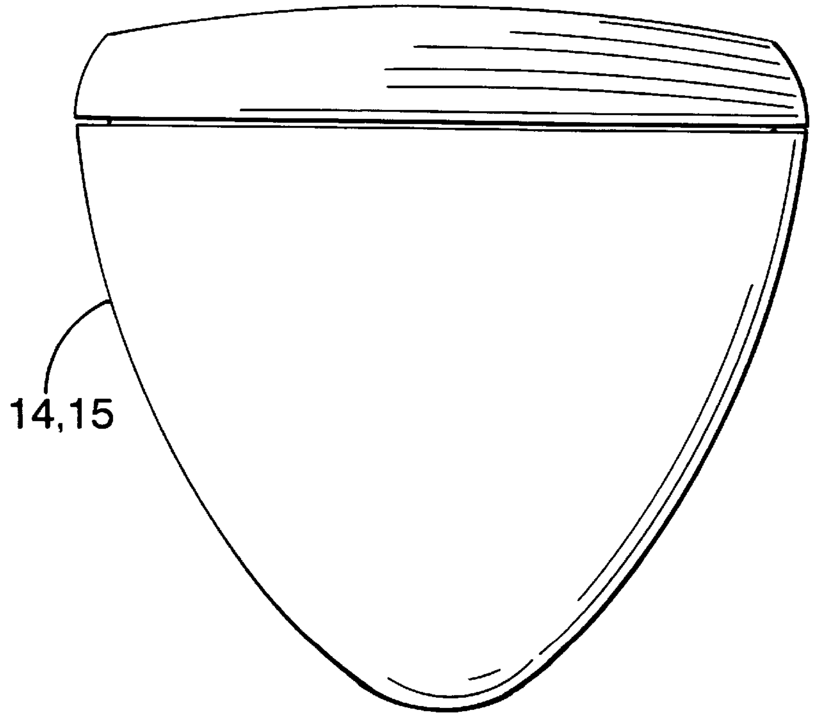

Referring to FIGS. 7A and 7B, there are shown front and top views of suitable upper frequency drivers.

Figure 8B:
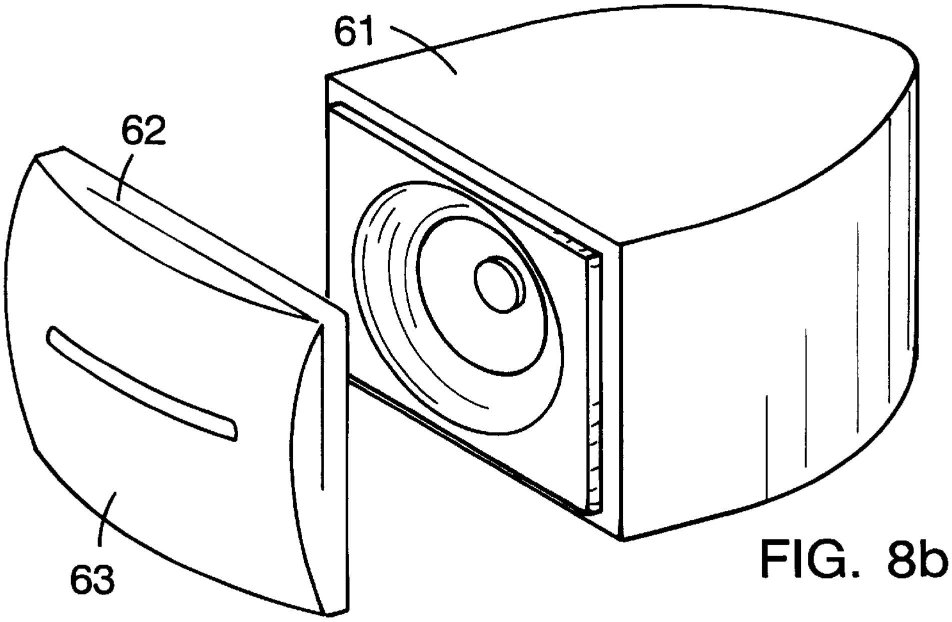
FIGS. 8A and 8B are pictorial assembly charts.
Figure 8A:
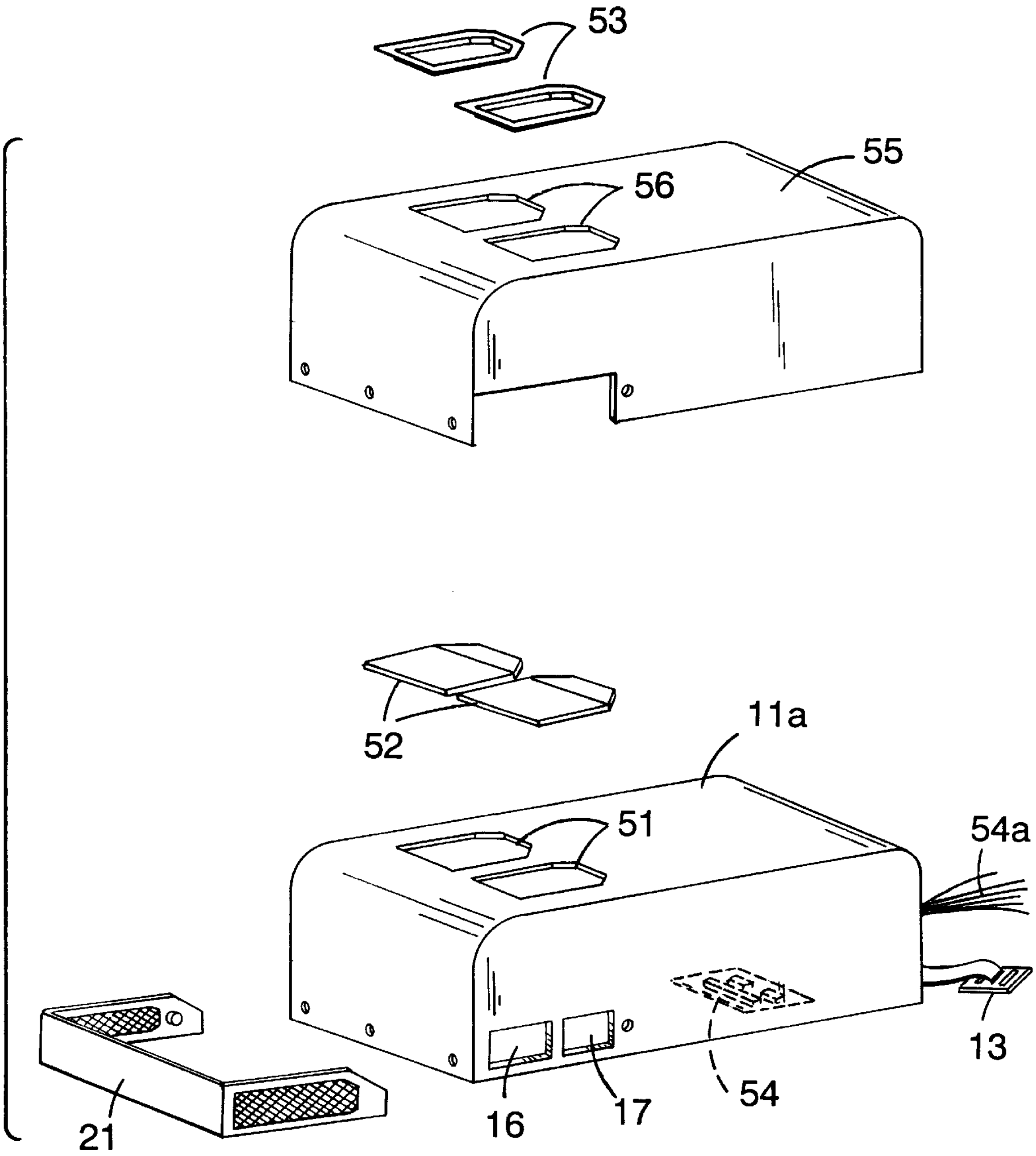

Referring to FIG. 8A, there is shown an assembly chart of an exemplary embodiment. The bass enclosure comprises a wood cabinet 11A having a top formed with recesses 51 for accommodating drink holders 52 covered by holder covers 53. Wood cabinet 11A also encloses an equalizer and wire assembly 54 terminating in wire connections 54A for receiving electrical signals. A cosmetic cover, typically plastic, covers wood cabinet 11A. Plastic cover 55 is formed with opening 56 for accommodating covers 53.

Referring to FIG. 8B, there is shown an assembly chart of an exemplary upper frequency driver comprising cube assembly 61 covered by grille frame 62 and grille 63.

The specific electrical connections and parameters may be formed in accordance with the techniques disclosed in the aforesaid U.S. patents and are not described in detail here to avoid obscuring the principles of the invention. Any suitable loudspeaker driver may be used in accordance with the principles of the invention.

Other embodiments are within the claims.

What is claimed is:

1. A vehicle electroacoustical transducing system comprising, a vehicle armrest having a bass enclosure, said enclosure having a length, width and height corresponding substantially to the length, width and height, respectively, of the vehicle armrest, wherein said bass enclosure is substantially rectangular having top and bottom panels, side panels and first and second end panels with an internal baffle extending along the length of said enclosure and formed with an opening for accommodating a loudspeaker driver near said first end panel.

2. A vehicle electroacoustical transducing system in accordance with claim 1 wherein said internal baffle is asymmetrically located inside said enclosure to define a first larger subchamber for accommodating said loudspeaker driver and a second smaller subchamber, a plurality of internal panels comprising first and second ports having side-by-side first and second outlets respectively in one of said side panels, said second subchamber being adjacent to said plurality of internal panels, said first port having an inlet for receiving energy from said second subchamber, said second port being L-shaped extending along the end of said enclosure adjacent to said second end panel and having an inlet opening into said first subchamber.

3. A vehicle electroacoustical transducing system in accordance with claim 2 and further comprising, the vehicle seat structure having side-by-side seats, said bass enclosure comprising an armrest located between said side-by-side seats.

4. A vehicle electroacoustical transducing system in accordance with claim 3 wherein said bass enclosure is made of wood and further comprising, a plastic cover over said top panel for contacting an arm of a passenger sitting in said seats.

5. A vehicle electroacoustical transducing system in accordance with claim 4 and further comprising, first and second upper frequency radiating cube loudspeaker drivers located in the front of said vehicle for radiating upper frequency spectral components.

6. A vehicle electroacoustical transducing system in accordance with claim 1 wherein said bass enclosure is formed with at least one port having an opening in one of said side panels.

7. A vehicle electroacoustical transducing system in accordance with claim 6 wherein said bass enclosure is formed with first and second side-by-side ports having openings in said side panel.

8. A vehicle electroacoustical transducing system in accordance with claim 7 wherein said openings are adjacent to said bottom panel and one of said end panels.

9. A vehicle electroacoustical transducing system in accordance with claim 8 and further comprising a U-shaped grill cover engaging the bottom of said one end panel and said side panels having at least one grill covering said openings.

10. A vehicle electroacoustical transducing system in accordance with claim 1 wherein said top panel is formed with at least one recess for accommodating a beverage container.

11. A vehicle electroacoustical transducing system in accordance with claim 1 wherein said bass enclosure is constructed and arranged to radiate sound energy having spectral components below a predetermined cutoff frequency sufficiently low so that listeners in the vehicle do not localize on sound energy exiting from the bass enclosure.

12. A vehicle electroacoustical transducing system comprising, a vehicle armrest having a bass enclosure, said enclosure having a length, width and height corresponding substantially to the length, width and height, respectively, of the vehicle armrest, wherein said bass enclosure is constructed and arranged to radiate sound energy having spectral components below a predetermined cutoff frequency sufficiently low so that listeners in the vehicle do not localize on sound energy exiting from the bass enclosure.

* * * * *